(12) United States Patent
Gentilhomme et al.

(10) Patent No.: US 6,386,125 B1
(45) Date of Patent: May 14, 2002

(54) SEED DRILL

(75) Inventors: Guy Gentilhomme, Louisfert; Patrice Challon, Bazouges, both of (FR)

(73) Assignee: Kuhn-Huard, Chateaubriant (FR)

( * ) Notice: Subject to any disclaimer, the term of this patent is extended or adjusted under 35 U.S.C. 154(b) by 0 days.

(21) Appl. No.: 09/960,746

(22) Filed: Sep. 24, 2001

(30) Foreign Application Priority Data

Oct. 5, 2000 (FR) .............................................. 00 12876

(51) Int. Cl.[7] .............................. A01C 5/00; A01C 7/18
(52) U.S. Cl. ..................................................... 111/55
(58) Field of Search .............................. 111/55, 59, 62, 111/63, 200

(56) References Cited

U.S. PATENT DOCUMENTS 4,191,262 A    3/1980  Sylvester .................... 172/459

FOREIGN PATENT DOCUMENTS

| DE | 3601 354 A1 | 7/1987 |
| EP | 0 612 464 A1 | 8/1994 |

*Primary Examiner*—Christopher J. Novosad
(74) *Attorney, Agent, or Firm*—Oblon, Spivak, McClelland, Maier & Neustadt, P.C.

(57) ABSTRACT

The seed drill of the present invention particularly includes a front chassis resting on the ground by wheels and a rear chassis carrying elements for planting seeds in the ground, the rear chassis being connected to the front chassis by a central articulation the axis of which is at least substantially vertical. The seed drill is one which additionally includes structure making it possible, as soon as the planting elements leave the earth, to align the rear chassis with respect to the front chassis. The object of the present invention is to avoid any possible shocks between the rear chassis and the front chassis, the shocks being caused by pivoting of the rear chassis about the central articulation when the seed drill is switched to the transport position on sloping ground.

20 Claims, 6 Drawing Sheets

SEED DRILL

BACKGROUND OF THE INVENTION

1. Field of the Invention

The present invention relates to the general technical field of agricultural machinery. It relates more specifically to a seed drill including:
- a hitching drawbar intended to be connected to a motor vehicle,
- a body including
    - a chassis made up:
        - of a front chassis connected to said hitching drawbar, carrying opening tools and resting on the ground by means of wheels which are connected thereto in such a way as to be able to be moved heightwise by means of connecting elements, and
        - of a rear chassis connected to the front chassis by means of a central articulation the longitudinal axis of which is at least substantially vertical, and
    - a sowing device including, amongst other things, a hopper and elements for planting seeds in the ground, these elements being carried by the rear chassis.

2. Discussion of the Background

A seed drill such as this is known from the state of the art, particularly from patent application EP 0 612 464. In addition to the features listed above, this known seed drill also includes locking means installed between the front chassis and the rear chassis. During work, these locking means advantageously allow the rear chassis to pivot freely with respect to the front chassis about said central articulation. By contrast, during transport, these locking means eliminate said pivoting. With this known seed drill, the opening tools are intended to prepare lines for sowing, in which lines the planting elements deposit the seed. The free pivoting of the rear chassis about said central articulation makes it possible, very advantageously when said seed drill enters a bend, for example, for each planting element to remain in the sowing line prepared by the corresponding opening tool. Eliminating the pivoting of the rear chassis about said central articulation is, for its part, necessary to ensure that the seed drill is stable while it is being transported. To this end, said locking means include locking elements installed on the connecting elements connecting the wheels to said front chassis.

During the switch to the transport position, said wheels are moved away from said front chassis and the seed drill is raised off the ground. When the wheels are in the position furthest from the front chassis, said locking elements automatically come into contact against the stops connected to the rear chassis. This contact on one hand causes said rear chassis to align with respect to said front chassis and on another hand causes said central articulation to be locked. During the switch to the work position, the wheels are brought closer to the front chassis and the seed drill is lowered toward the ground. As soon as the wheels have left their position furthest from the front chassis, the locking elements automatically release the rear chassis. The latter can then once again pivot freely about the central articulation.

With this known seed drill, said central articulation is therefore unlocked, during the switch to the work position, before said planting elements have come into contact with the ground. In addition, during the switch to the transport position, said front and rear chassis are aligned and said central articulation is locked well after said planting elements have left the earth.

Under certain working conditions, this known seed drill may exhibit a drawback. What happens is that when the seed drill is inclined, the rear chassis naturally tends, because of its weight, to pivot with respect to the front chassis about said central articulation. Thus, during the switch to the transport position, with said seed drill being inclined, said rear chassis pivots about said central articulation as soon as said planting elements have come out of the earth. This then results in a shock, the violence of which varies according to the magnitude of the inclination, between said front chassis and said rear chassis. This repeated shock causes mechanical stresses which are detrimental to the life of the seed drill as a whole.

SUMMARY OF THE INVENTION

It is a purpose of the present invention to overcome this drawback of the state of the art.

Accordingly, the seed drill according to the present invention is one which includes means making it possible, as soon as said planting elements leave the earth, to align said rear chassis with respect to said front chassis. Thus, the shock described above is eliminated.

According to another feature of the invention, said alignment means also make it possible, during transport, to eliminate the pivoting of the rear chassis about the central articulation. The seed drill according to the invention therefore does not need additional locking means in order to ensure that the machine is stable during transport.

According to an additional feature of the invention, said alignment means also, during work, allow the rear chassis to pivot freely about the central articulation. The planting elements can therefore advantageously, when the seed drill according to the invention enters a bend, for example, follow the sowing lines prepared by the opening tools.

According to an additional feature of the invention, said alignment means also make it possible, during work if necessary, to eliminate the pivoting of the rear chassis about the central articulation. Said planting elements will be able, remarkably, even when working on a sideways slope, to follow the sowing lines prepared by the opening tools.

BRIEF DESCRIPTION OF THE DRAWINGS

Other features of the invention, to be considered separately or in any possible combination, will also become apparent from the subclaims and from the following description of one nonlimiting exemplary embodiment of the invention which is depicted in the appended drawings, in which:

DESCRIPTION OF THE PREFERRED EMBODIMENT

Figure 1:
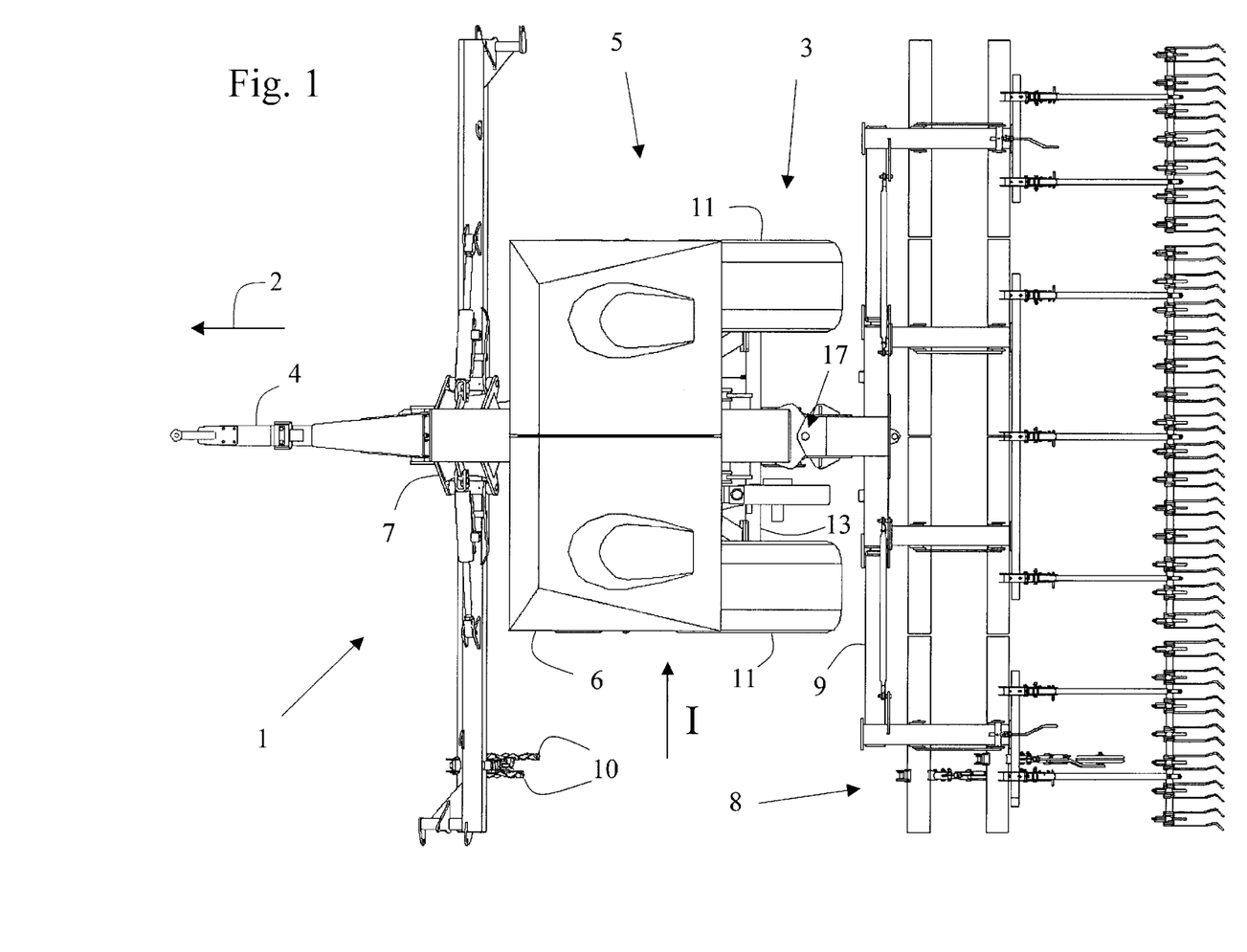
FIG. 1 depicts a top view of a seed drill according to the invention.
Figure 2:
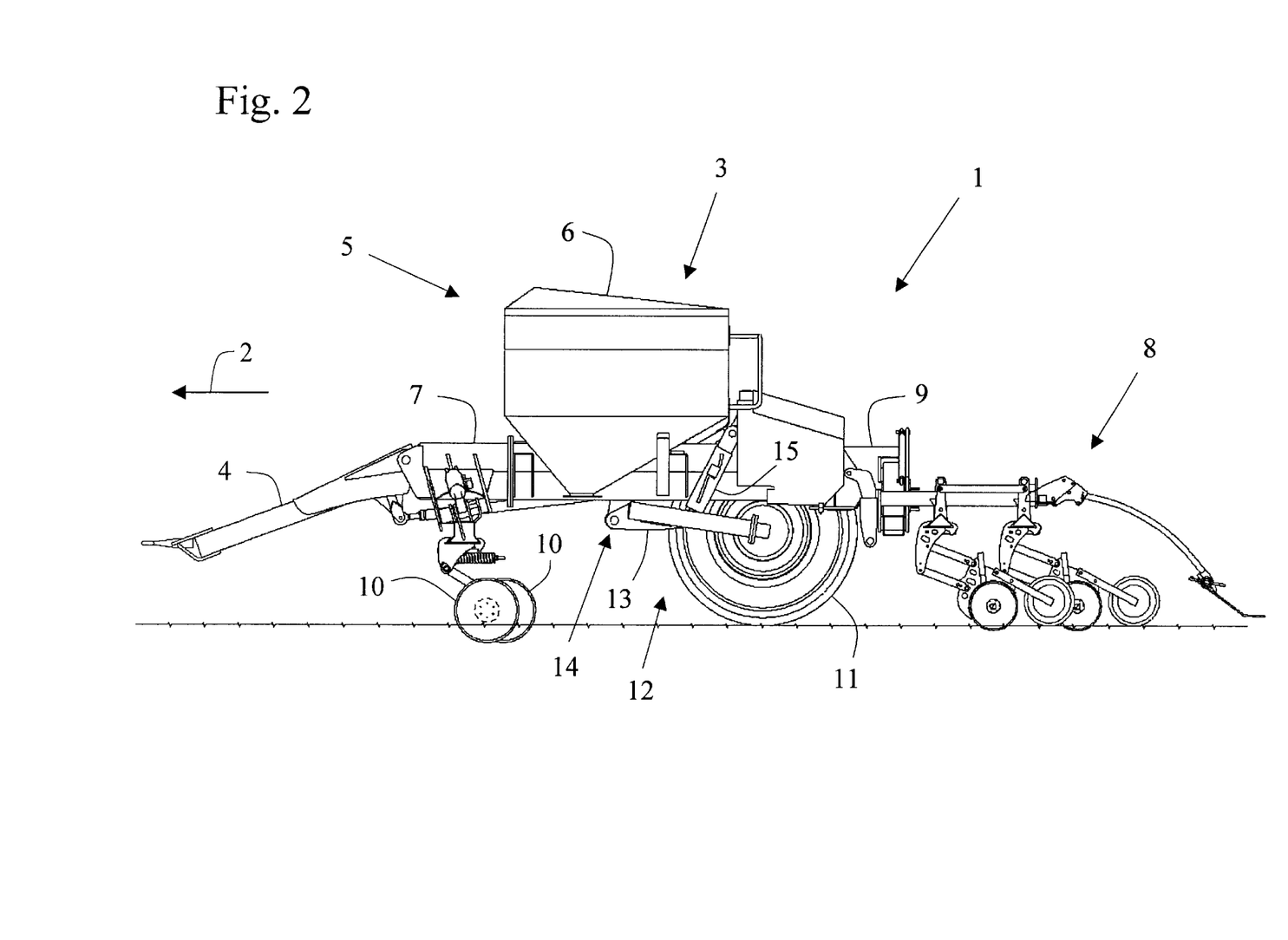
FIG. 2 depicts, viewed in the direction of arrow I defined in FIG. 1, the seed drill of FIG. 1.

FIG. 1 depicts a top view of a seed drill 1 according to the present invention. During work or during transport, said seed drill 1 is towed in a direction and a direction of forward travel indicated by the arrow 2. In the remainder of the description, the ideas of "front" and "rear", and "in front of" and "behind" are defined with reference to the direction of forward travel 2 and the ideas of "right" and "left" are defined on viewing said seed drill 1 from the rear in the direction of forward travel 2.

In a way known to those skilled in the art, said seed drill 1 has a body 3 connected to the rear of a tractor vehicle (not depicted) by means of a hitching drawbar 4. In its turn, said body 3 includes a sowing device 5 supported by a chassis. More specifically, in the exemplary embodiment depicted in the figures, said sowing device 5 is made up in particular of a hopper 6 connected to a front chassis 7 and of elements 8 for planting seeds in the ground, which are supported by a rear chassis 9.

Said seed drill 1 depicted in the figures makes it possible, in a particularly advantageous way, to prepare and to sow a strip of earth in a single pass. To this end, said front chassis 7 also supports opening tools 10 arranged in front of said planting elements 8 and in a row that is at least substantially horizontal and perpendicular to said direction of forward travel 2.

For reasons of clarity, said seed drill 1 depicted in FIG. 1 has just two opening tools 10. In practice, said opening tools 10 are distributed at least substantially uniformly across the entire working width of said seed drill 1. This comment also goes for said planting elements 8. In a way also known to those skilled in the art, said front chassis 7 rests at least partially on the ground by means of two wheels 11. Said wheels 11 are connected to said front chassis 7, advantageously in such a way as to be movable heightwise, by means of connecting elements 12. In the exemplary embodiment depicted in the figures, said connecting elements 12 are made up, in particular, of a carriage 13 connected to said front chassis 7 by means of an articulation 14 the axis of which is at least substantially horizontal and perpendicular to said direction of forward travel 2. Said carriage 13 can be pivoted about said articulation 14 by means of at least one lifting ram 15. Thus, by pivoting said carriage 13 about said articulation 14, said wheels 11 can be moved away from or closer to said front chassis 7. Said seed drill 1 can thus be lowered for work or raised for transport. As a preference, said seed drill 1 also includes an adjusting device 16, depicted schematically in FIG. 6, defining the maximum lowering of said seed drill 1. As a result, the working depth of said opening tools 10 can easily be adjusted.

In the exemplary embodiment depicted in the figures, the front of said rear chassis 9 is connected to the rear of said front chassis 7 by means of a central articulation 17 the axis 17a of which is at least substantially vertical. Said central articulation 17 advantageously lies in a vertical mid-plane of said front chassis 7. As a preference, said central articulation 17 is also arranged substantially mid-way between said opening tools 10 and said planting elements 8. Thus, when said seed drill 1 takes a bend, said central articulation 17 allows said planting elements 8 to follow the tracks of said opening tools 10.

According to an important feature of the present invention, said seed drill 1 additionally includes means 18 making it possible, as soon as said planting elements 8 leave the earth, to align said rear chassis 9 with respect to said front chassis 7.

In the exemplary embodiment depicted in the figures, said alignment means 18 are made up in particular of a pin 19 connected to said rear chassis 9, of a jaw 20 connected to said front chassis 7 and of an alignment ram 21. Aligning said rear chassis 9 with said front chassis 7 is achieved by sliding, using said alignment ram 21, said pin 19 in said jaw 20.

Figure 3:
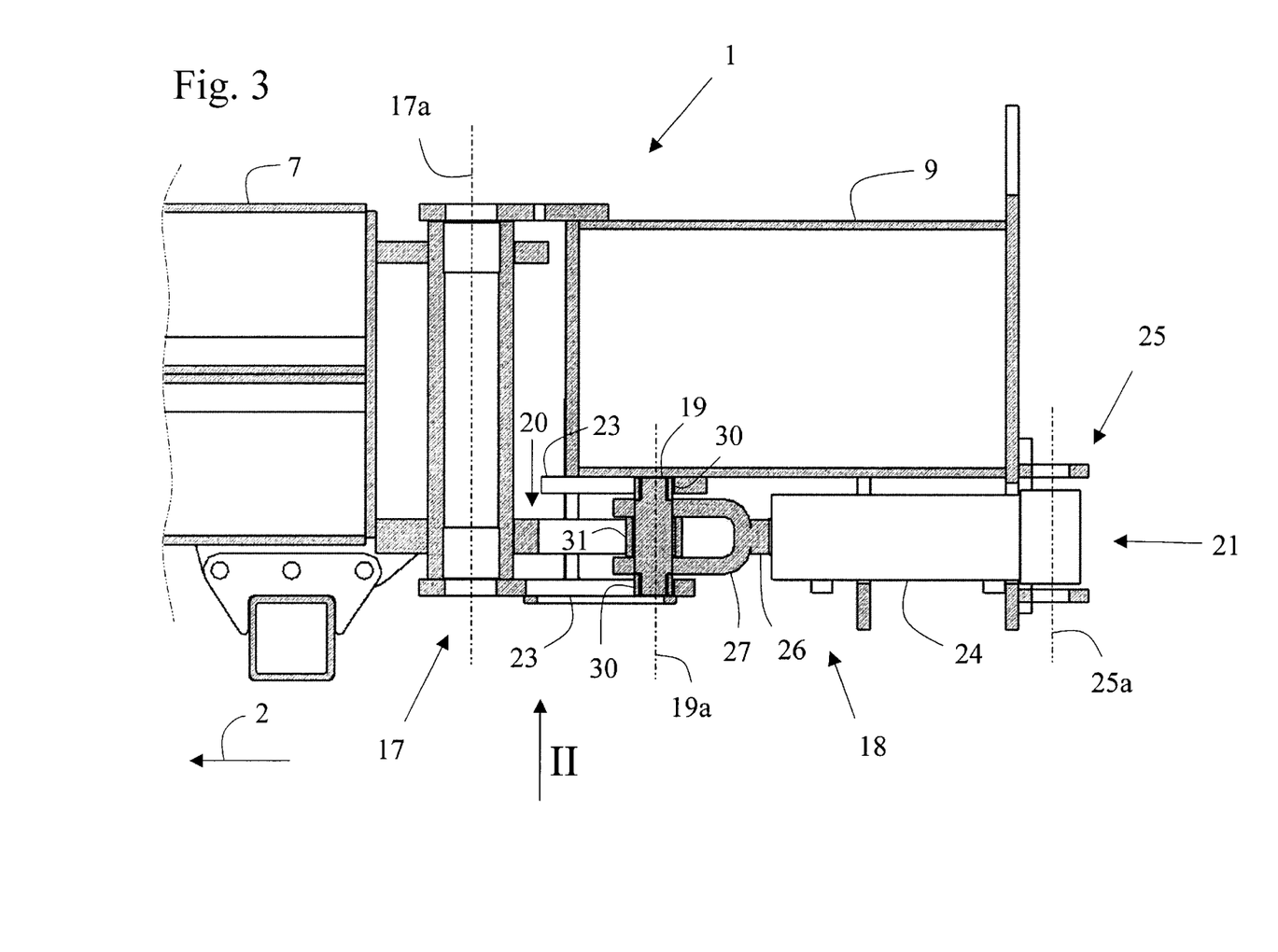
FIG. 3 depicts, viewed in section in the direction of arrow I defined in FIG. 1 and on another scale, one exemplary embodiment of the means allowing the two chassis to be aligned.
Figure 4:
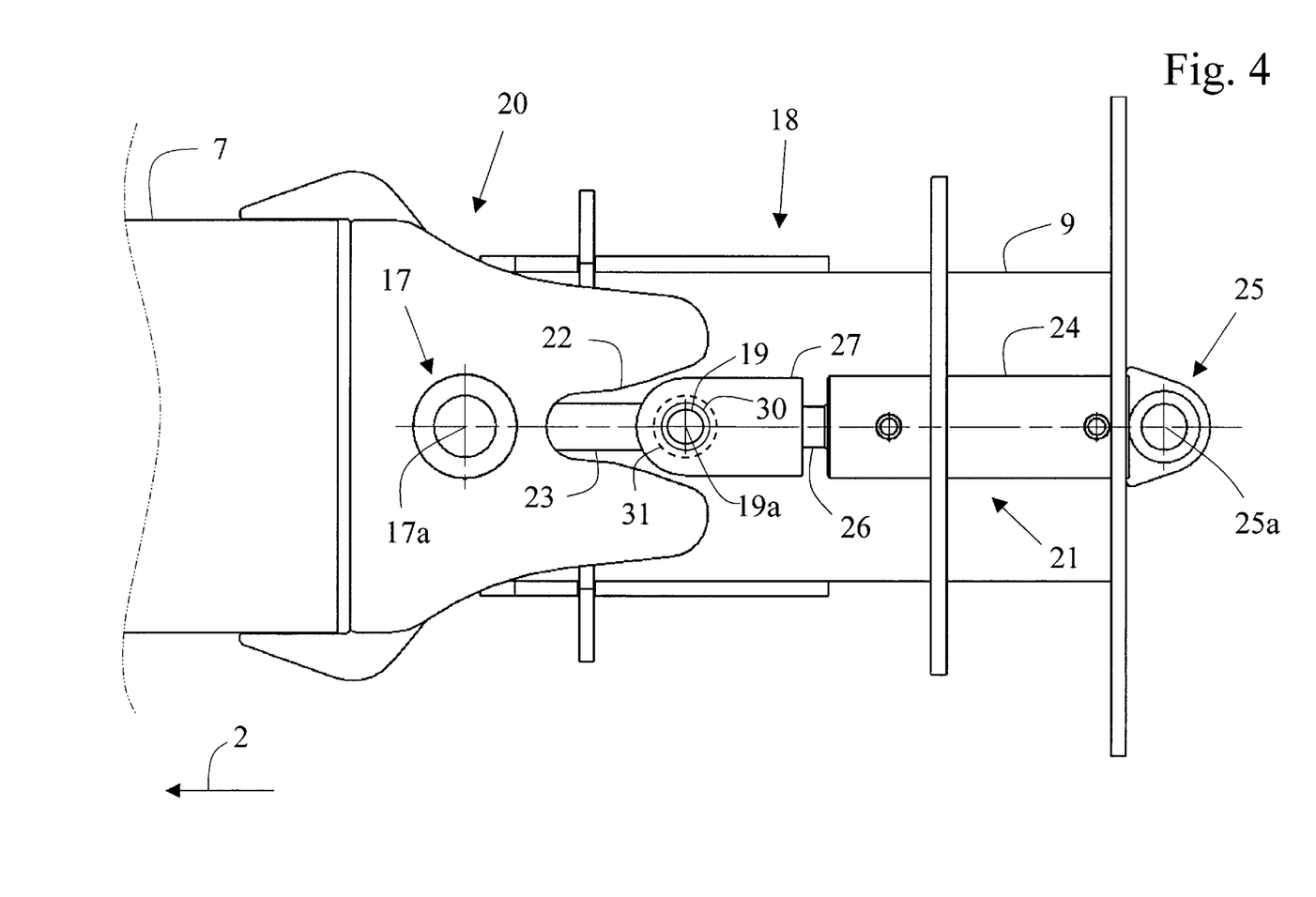
FIG. 4 depicts, viewed in the direction of arrow II defined in FIG. 3, said alignment means in one position.
Figure 5:
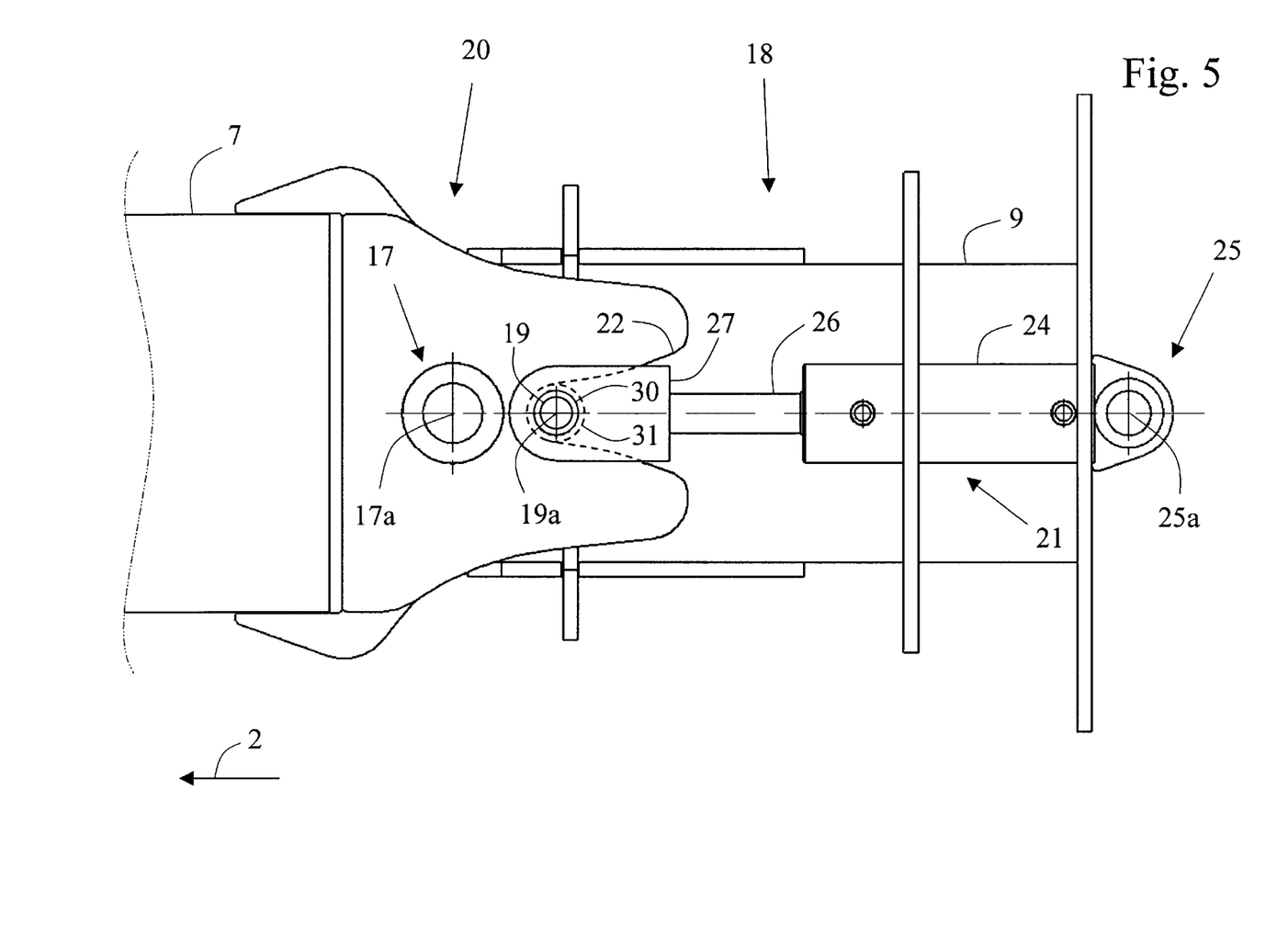
FIG. 5 depicts, in the same view as FIG. 4, the locking device in another position, FIG. 6 schematically depicts a hydraulic circuit with which the seed drill of FIG. 1 is equipped.

More specifically, in the light of FIGS. 3 to 5, said jaw 20 includes an alignment ramp 22 at least substantially describing the shape of a V, lying in a plane that extends at least substantially horizontally. Said alignment ramp 22 is advantageously arranged in such a way as to be at least substantially symmetric, on each side of the vertical midplane of said front chassis 7. In addition, the opening of the V formed by said alignment ramp 22 is oriented toward the rear of said seed drill 1.

For its part, said pin 19 includes a longitudinal axis 9a oriented at least substantially vertically. Said pin 19 is guided in translation by means of two guide grooves 23 connected to said rear chassis 9. Said guide grooves 23 are advantageously arranged vertically above one another in at least substantially horizontal respective planes. As a preference, said guide grooves 23 are arranged symmetrically on each side of said plane in which said jaw 20 extends. In addition, and referring in particular to FIG. 4, said guide grooves 23 are oriented along a vertical mid-plane of said rear chassis 9. Said pin 19 is therefore guided in translation in said vertical mid-plane of said rear chassis 9 in an at least substantially horizontal direction.

Said alignment ram 21, for its part, includes a body 24 connected to said rear chassis 9 by means of an articulation 25 the axis 25a of which is at least substantially vertical. Said alignment ram 21 also includes a rod 26 connected to said pin 19 by means of a yoke 27. As a preference and as depicted in FIG. 3, each flange of said yoke 27 is arranged between said jaw 20 and a respective guide groove 23.

FIGS. 3 and 4 more particularly depict said alignment means 18 in the rear position. In this configuration, used when said seed drill 1 is in the work position, said alignment ram 21 is at its minimum stroke and said pin 19 is at the entry to said alignment ramp 22. Said rear chassis 9 can therefore pivot freely about said central articulation 17 with an angular travel which is delimited by contact of said pin 19 against said alignment ramp 22. As a preference, the entry to said alignment ramp 22 is advantageously given a relatively large width by comparison with the diameter of said pin 19. As a result, during work, the angular travel of said rear chassis 9 with respect to said front chassis 7 is great enough to allow said planting elements 8 to follow the tracks of said opening tools 10. By contrast, the width of the entry to said alignment ramp 22 is narrow enough to avoid any shock between elements connected to said front chassis 7 and elements connected to said rear chassis 9.

For its part, FIG. 5 depicts said alignment means 18 in the front position. In this configuration, used when said seed drill 1 is in the transport position, said alignment ram 21 is at its maximum stroke and said pin 19 lies at the bottom of said alignment ramp 22. As a preference, the width of said alignment ramp 22 decreases gradually between the entry and the bottom thereof.

Thus, irrespective of the angular position of said rear chassis 9 with respect to said front chassis 7, a movement of said pin 19 from the rear position toward the front position causes this pin to come into abutment against said alignment ramp 22. Said rear chassis 9 can therefore not move further away from the alignment with said front chassis 7. Shocks between said rear chassis 9 and said front chassis 7 are therefore eliminated. Then, by resting against said alignment ramp 22, said pin 19 is brought gradually toward said vertical mid-plane of said front chassis 7. This has the effect of pivoting said rear chassis 9 to align it with respect to said front chassis 7.

For reasons of clarity, FIGS. 3 to 5 depict only said alignment means 18, said front chassis 7 partially and said rear chassis 9 partially. Apart from said body 24 of said alignment ram 21, these elements 7, 9, 18 are depicted in section in FIG. 3. In addition, in FIGS. 4 and 5, all these elements 7, 9, 18 are depicted except for the lower guide groove 23.

According to another feature of the present invention, alignment of said rear chassis 9 with respect to said front chassis 7 takes place automatically when said planting elements 8 leave the earth. For this purpose, said alignment means 18 are advantageously connected to said connecting elements 12.

Figure 6:
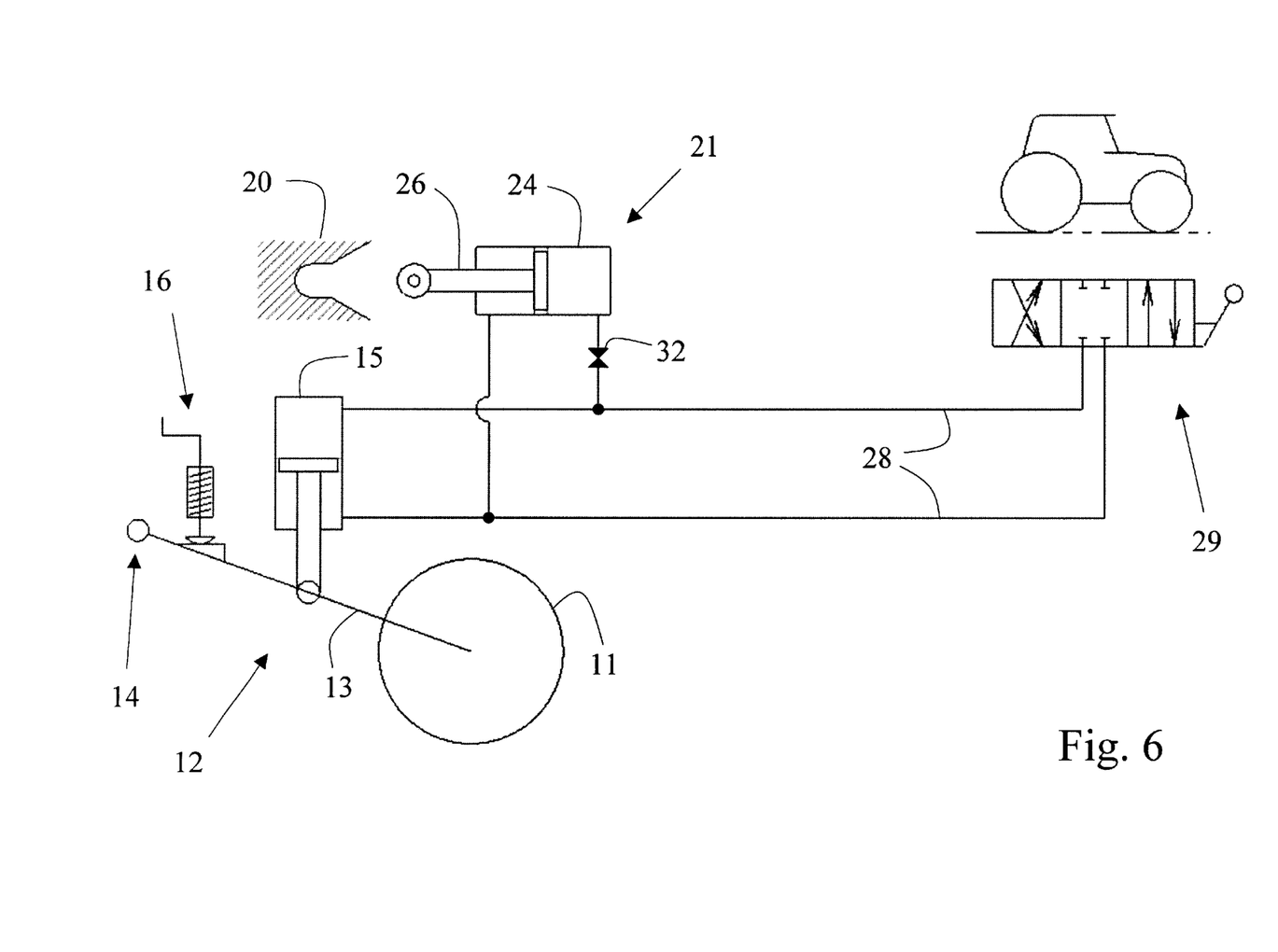

Thus, in the exemplary embodiment depicted in the figures and more particularly in FIG. 6, said lifting ram 15 is a double-acting ram fed, by means of pipes 28, by a hydraulic circuit (not depicted) of said tractor vehicle. As a preference, said lifting ram 15 is operated by the user from the driving seat of said tractor vehicle by means of a three-position directional-control valve 29. In a way known to those skilled in the art, said directional-control valve 29 causes said lifting ram 15 either to extend, or to contract, or immobilizes it.

For its part, said alignment ram 21, also of the double-acting type, is advantageously connected in parallel with said lifting ram 15. More specifically, the connection between said rams 15; 21 is such that causing said lifting ram 15 to extend also causes said alignment ram 21 to extend. In addition, said alignment ram 21 advantageously takes priority over said lifting ram 15. As a result, said alignment ram 21 extends before said lifting ram 15 extends. This can be achieved, for example, through a suitable choice of the cross section of the respective pistons of said rams 15; 21. In a particularly advantageous way, in order not to deform said planting elements 8 during the switch to the transport position, said alignment means 18 cannot pivot said rear chassis 9 while said planting elements 8 are still in the earth. This can be achieved by choosing a relatively small cross section for the piston of said alignment ram 21.

Thus, when the user operates said directional-control valve 29 to place said seed drill 1 in the transport position, the hydraulic circuit first of all causes said alignment ram 21 to extend and therefore brings said pin 19 into abutment against said alignment ramp 22. As said alignment ram 21 is not powerful enough to be able to pivot said rear chassis 9 when said planting elements 8 are still in the earth, said hydraulic circuit next causes said lifting ram 15 to extend and therefore causes said seed drill 1 to be raised. Finally, as soon as said planting elements 8 have left the ground, said alignment ram 21 once again takes priority and said rear chassis 9 is aligned with respect to said front chassis 7.

It will also be understood that the hydraulic circuit depicted in FIG. 6 causes said alignment ram 21 to contract when the user, using said directional-control valve 29 orders the contracting of said lifting ram 15. In a particularly advantageous way, during the switch to the work position, the weight of said body 3 means that said seed drill 1 is lowered before said alignment ram 21 contracts. Thus, said central articulation 17 is unlocked only from the moment said planting elements 8 come into contact with the ground. As said seed drill 1 is inclined, said rear chassis 9 does not carry the risk of running into said front chassis 7 during the switch to the work position.

As a preference, contact of said pin 19 with said rear chassis 9 and contact of said pin 19 with said jaw 20 take place via rollers 30, 31. Thus, each end of said pin 19 has an end roller 30 rolling in a respective guide groove 23. In addition, said pin 19 includes a third roller 31 arranged facing said alignment ramp 22. Said rollers 30, 31 considerably reduce the friction forces experienced by said pin 19. The latter, in spite of the torque needed to align said rear chassis 9, can thus easily be slid by said ram 21.

As a further preference, the width of the bottom of said alignment ramp 22 at least substantially corresponds to the diameter of said third roller 31. Thus, when said pin 19 is in the forward position (FIG. 5), said alignment means 18 cause said central articulation 17 to lock, this encouraging good stability of said seed drill 1 while it is being transported.

In the exemplary embodiment depicted in FIG. 6, said seed drill 1 additionally includes an isolation valve 32 connected to one of the pipes feeding said alignment ram 21. By closing said isolation valve 32, the user can immobilize said alignment ram 21, for example, in its extended position (FIG. 5). Thus the user may, if necessary, and in spite of the switch of said seed drill 1 to the work position, keep said rear chassis 9 aligned with said front chassis 7. This may be particularly advantageous when working land with a steep inclination.

The seed drill 1 which has just been described is merely one example which must not in any way be taken to limit the field of protection defined by the claims which follow.

What is claimed as new and desired to be secured by Letters Patent of the United States is:

1. Seed drill including:
    a hitching drawbar intended to be connected to a motor vehicle,
    a body including
        a chassis made up:
            of a front chassis connected to said hitching drawbar, carrying opening tools and resting on the ground by means of wheels which are connected thereto in such a way as to be able to be moved heightwise by means of connecting elements, and
            of a rear chassis connected to said front chassis by means of a central articulation the axis of which is at least substantially vertical, and
        a sowing device including, amongst other things, a hopper and elements for planting seeds in the ground, these elements being carried by the rear chassis,
    which seed drill additionally includes means making it possible, as soon as said planting elements leave the earth, to align said rear chassis with respect to said front chassis.

2. Seed drill as claimed in claim 1, wherein said means automatically, as soon as said planting elements leave the earth, align said rear chassis with respect to said front chassis.

3. Seed drill as claimed in claim 1, wherein said alignment means during transport eliminate the pivoting of said rear chassis with respect to said front chassis about said central articulation.

4. Seed drill as claimed in claim 1, wherein said alignment means allow said rear chassis to pivot with respect to said front chassis about said central articulation only when said planting elements come into contact with the ground.

5. Seed drill as claimed in claim 1, wherein said alignment means are connected to said connecting elements.

6. Seed drill as claimed in claim 1, wherein said alignment means include a pin.

7. Seed drill as claimed in claim 6, wherein said pin is connected to said rear chassis.

8. Seed drill as claimed in claim 6, wherein said pin is guided in translation by means of two guide grooves in a vertical mid-plane of said rear chassis and in an at least substantially horizontal direction.

9. Seed drill as claimed in claim 8, wherein each end of said pin has an end roller rolling in a respective guide groove.

10. Seed drill as claimed in claim 1, wherein said alignment means also include a jaw.

11. Seed drill as claimed in claim 10, wherein said jaw is connected to said front chassis.

12. Seed drill as claimed in claim 10, wherein said jaw includes an alignment ramp at least substantially describing the shape of a V, lying in a plane that extends at least substantially horizontally.

13. Seed drill as claimed in claim 12, wherein said alignment ramp is arranged in such a way as to be at least substantially symmetric on each side of a vertical mid-plane of said front chassis.

14. Seed drill as claimed in claim 12, wherein each end of said pin has an end roller rolling in a respective guide groove wherein said pin includes a third roller arranged facing said alignment ramp.

15. Seed drill as claimed in claim 1, wherein said alignment means additionally include an alignment ram.

16. Seed drill as claimed in claim 15, wherein said alignment ram includes a body connected to said rear chassis by means of an articulation.

17. Seed drill as claimed in claim 15, wherein said alignment means include a pin wherein said alignment ram includes a rod connected to said pin by means of a yoke.

18. Seed drill as claimed in claim 15, wherein said alignment ram is of the double-acting type.

19. Seed drill as claimed in claim 15, wherein said alignment ram is connected in parallel with a lifting ram which moves said wheels heightwise with respect to said front chassis.

20. Seed drill as claimed in claim 15 which additionally includes an isolation valve connected to a pipe feeding said alignment ram.

* * * * *